United States Patent

Josef Fröhlich

[15] 3,649,056
[45] Mar. 14, 1972

[54] TURNING JOINT FOR PIPES

[72] Inventors: Josef Fröhlich, Dusseldorf-Rath, Germany; Jacob Leguyt, Dordrecht, Netherlands

[73] Assignee: Mannesmann Aktiengesellschaft, Dusseldorf, Germany

[22] Filed: Sept. 28, 1970

[21] Appl. No.: 75,912

[30] Foreign Application Priority Data

Sept. 30, 1969 Germany..................P 19 50 324.3

[52] U.S. Cl..............................................285/276, 285/281
[51] Int. Cl........................................................F16l 27/08
[58] Field of Search..................285/276, 280, 281, 278, 275, 285/272, 98

[56] References Cited

UNITED STATES PATENTS

| | | | |
|---|---|---|---|
| 1,737,465 | 11/1929 | Lindsey | 285/275 X |
| 2,549,951 | 4/1951 | Warren | 285/276 X |
| 2,689,753 | 9/1954 | Wechsler | 285/272 |
| 3,468,564 | 9/1969 | Frölich | 285/276 X |
| 3,514,127 | 5/1970 | Brooker | 285/276 X |

*Primary Examiner*—Reinaldo P. Machado
*Assistant Examiner*—Wayne L. Shedd
*Attorney*—Smyth, Roston & Pavitt and Ralf H. Siegemund

[57] ABSTRACT

Two pipe ends are interconnected through ball bearings having their two races connected respectively to two telescoped retaining rings. A sealing ring is disposed and retained between these rings in the center plane of the bearings. The sealing ring has smaller diameter than the bearings.

2 Claims, 1 Drawing Figure

Patented March 14, 1972  3,649,056
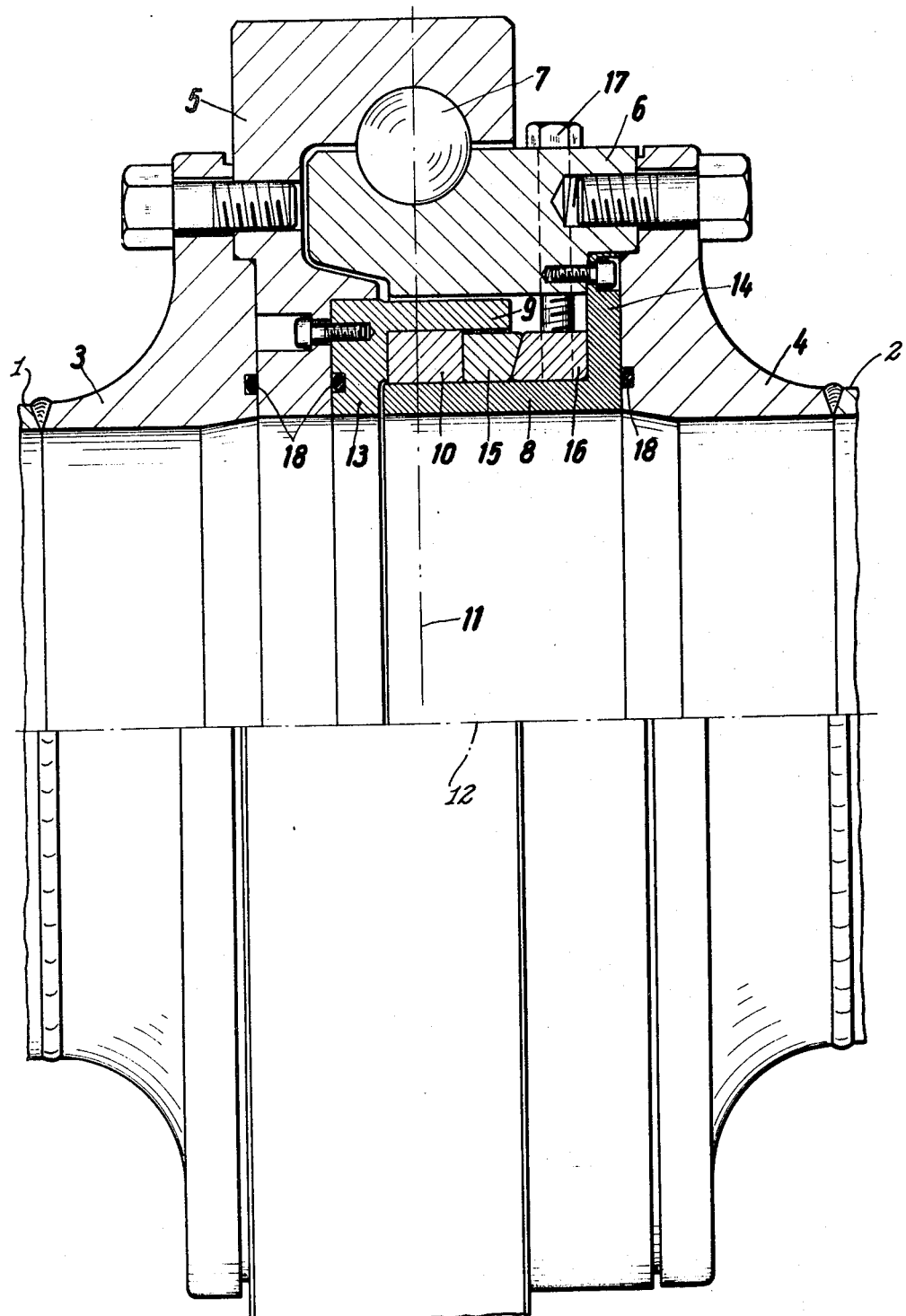
Inventors:
JOSEF FRÖHLICH
JACOB LEGUYT

TURNING JOINT FOR PIPES

The present invention relates to a turning joint for pressurized pipes and including bearings with rolling elements and two races that are connected individually to the two pipes. Joints of that type require additionally a sealing ring which is usually disposed between the two race defining elements of the bearings. Turning or rotatable joints for connection of pipes are needed in articulated pipelines as they are employed for loading and unloading of tankers or tanker trucks. Particularly a loading boom for running a pipe to a moored vessel needs pipe connections that permit relative turning of the interconnected piping.

Such a turning joint is subjected to considerable forces there is the internal pressure, there are forces that pull on the pipes in opposite direction, and particularly, bending forces occur which tend to tilt bearing parts. Any displacement of the bearing parts relative to each other by operation of the several forces is limited essentially by bearing play, i.e., by clearance and tolerances of the bearing elements. Still, tilting of the pipes changes the gap to be sealed by the sealing ring. As long as the ring has sufficient elasticity or is spring biased, the change in the dimensions of the gap will be of little consequence. However, in cases the pipes serve as conduit for a medium whose chemical and/or physical characteristics require employment of particular material for the sealing ring that has little elasticity.

The problem solved by the present invention is to provide a turning joint for pipes in which the gap to be sealed will undergo only little changes in dimension, particularly in case bending forces act on the joint, so that sealing material of low elasticity can be employed, because other requirements are more important. For regular use of the pipes, the effective gap should be adjustable particularly to offset any long term changes. Situations requiring low elasticity type sealing rings rise where the medium running through the pipeline is highly corrosive or liquefied natural gas having temperature of about 180° Centigrade. Regular use is, for example, the conveying of crude oil.

In accordance with the present invention, it is suggested to locate the sealing ring in the plane of the circle as defined by the centers of the rolling elements of the bearings, whereby the sealing ring is disposed within that circle, having smaller diameter than the latter accordingly. Thus, in case of tilting of the tubes so interconnected and for an angle determined by the bearing tolerances, the sealing gap changes dimensions to a lesser degree. This, in turn, limits the elasticity requirements for the sealing ring in that gap.

In accordance with the preferred embodiment for practicing the invention, inner and outer race, defining bearing rings, are respectively connected to two telescoped retaining rings defining a radial gap. The sealing ring is disposed in that gap. The two retaining rings each have an axial flange; the flange on the inner retaining ring extends radially out, while the flange on the outer ring extends radially inwardly. These two flanges define a particular axial length of that radial gap. The sealing ring is disposed, for example, so as to abut the inwardly directed flange, assuming that the flange has axial distance from the plane defined by the bearing circle smaller than the width of the sealing ring so that the latter ring is in fact traversed by that plane. Axial spacer means are interposed between the other outwardly directed flange and the sealing ring to determine the precise axial length of the gap for and occupied by the sealing ring. The spacer means are preferably comprised of a ring and of one or several spacer elements.

A particular advantage of the construction in accordance with the invention is to be seen in that the parts that undergo maximum wear, i.e., the sealing ring and the spacer means, are readily replaced.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE illustrates partially a section view, partially a side elevation of a pipe joint improved in accordance with the preferred embodiment of the invention.

Proceeding now to the detailed description of the drawing, there is shown a turning joint for interconnecting tubes or pipes 1 and 2. The two pipes have common axis 12. The connection is essentially provided by means of ball bearings having a ring 6 defining an inner race. Race 6 is bolted to a flange member 4 which, in turn, is for example, welded to the end of pipe 2. An outer ring 5 defining the outer race of the ball bearings is bolted to a flange 3 that, in turn, is welded to the end of pipe 1. Balls 7 are disposed between the two races defining rings 5 and 6.

An inner retaining ring 8 having a flange 14 is bolted to and received by inner race 6. Flange 14 extends radially outwardly from ring or sleeve 8. An outer retaining ring 9 has a flange 13 by means of which ring 9 is bolted to outer race 5. Flange 13 extends radially inwardly from ring or sleeve 9. Retaining ring or sleeve 9 extends, radially, between ring or sleeve 8 and bearing ring 6, but clearing the latter. The two retaining rings, 8 and 9, define a particular radial gap whose axial dimensions are determined by the distance between the two flanges 13 and 14; a sealing ring 10 is interposed between rings 8 and 9, within that gap.

The sealing ring 10 has diameter that is significantly smaller than the diameter of the ball bearings as defined, for example, by the circle on which the centers of the balls 7 are located. That circle defines a center plane 11 of the bearings; plane 11 extends transverse to pipe axis 12 which is also the turning axis of the joint. The sealing ring 10 is traversed by that plane 11. The assembly includes a plurality of O-rings 18 disposed in suitable grooves for sealing 3, 5 and 18 as one group and parts 4 and 14 as the other group of fixedly interconnected elements.

Having shown the actual position of sealing 10, the definition of that position is arrived at as follows. In particular, sealing ring 10 has a specific axial position between rings or sleeves 8 and 9 which requires the two flanges 13 and 14 to extend on opposite sides of plane 11. That axial position is determined, on one hand, by abutment to flange 13 of ring 9. On the other hand, spacer means 15-16 are comprised on an axially displaceable compression ring 15 having bevelled surface that bear against bevelled wedges 16. Thus, there is a plurality of these wedges 16, distributed uniformly around the axis 12 and adjacent to ring 15. However, each wedge 16 is displaceable transverse to the direction of displacement of ring 15; that is radially outwardly. Each wedge piece may be so displaced through manipulation of an associated adjusting screw 17.

As it can be seen, the axial dimension of the sealing gap occupied by ring 10 is determined by the axial distance between flange 13 and ring 15. That distance becomes adjustable through radial displacement of wedges 16.

This way, in turn, compression of sealing ring 10 can be adjusted from the exterior.

Ball bearings are shown in the example above, but roller bearings may also be employed.

The invention is not limited to the embodiments described above but all changes and modifications thereof not constituting departures from the spirit and scope of the invention are intended to be included.

We claim:

1. Connection between two pipes that permits relative turning of the pipes on their axes, the connection to include rolling friction-type bearings having a first ring connected to one of the pipes and defining an inner race and a second ring connected to the other one of the pipes, defining an outer race for rolling elements in between, comprising:

a first retaining ring connected to the first bearing ring;

a second retaining ring connected to the second bearing ring and circumscribing the first retaining ring, there being a radial gap between the first and second retaining rings, the center plane of the bearings as defined by the location of the rolling elements, traversing that gap;

a radially outwardly directed flange on the first retaining ring;

a radially inwardly directed flange on the second retaining ring, the two flanges axially displaced to and on opposite sides of said center plane;

a sealing ring in said gap between the first and second retaining rings and having axial dimensions smaller than the axial distance of the two flanges; and axial spacer means in the gap and positioning the sealing ring in axial direction so that the center plane runs through the sealing ring.

2. Connection as in claim 1, the spacer means including means for adjustment of the effective axial length.

* * * * *